United States Patent
Gyllenskog

(10) Patent No.: US 11,734,193 B2
(45) Date of Patent: Aug. 22, 2023

(54) EXCLUSION REGIONS FOR HOST-SIDE MEMORY ADDRESS TRANSLATION

(71) Applicant: Micron Technology, Inc., Boise, ID (US)

(72) Inventor: Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/531,581

(22) Filed: Nov. 19, 2021

(65) Prior Publication Data

US 2022/0188246 A1 Jun. 16, 2022

Related U.S. Application Data

(60) Provisional application No. 63/125,303, filed on Dec. 14, 2020.

(51) Int. Cl.
*G06F 12/00* (2006.01)
*G06F 12/1045* (2016.01)
(Continued)

(52) U.S. Cl.
CPC ...... *G06F 12/1045* (2013.01); *G06F 12/0246* (2013.01); *G06F 13/1668* (2013.01); *G06F 2212/7201* (2013.01)

(58) Field of Classification Search
CPC ............. G06F 12/1045; G06F 12/0246; G06F 13/1668; G06F 2212/7201; G06F 2212/7208; G06F 2212/1024; Y02D 10/00

(Continued)

(56) References Cited

U.S. PATENT DOCUMENTS

| 2014/0082268 A1 | 3/2014 | Kim et al. |
| 2017/0131917 A1 | 5/2017 | Yun et al. |

(Continued)

FOREIGN PATENT DOCUMENTS

| EP | 3647930 A1 | 5/2020 | |
| JP | 2016525240 A | * 1/2016 | |
| TW | 202028982 A | * 8/2020 | ......... G06F 12/0246 |

OTHER PUBLICATIONS

"International Search Report and Written Opinion of the International Searching Authority," issued in connection with Int'l Appl. No. PCT/US21/72791, dated Mar. 18, 2022 (13 pages).

*Primary Examiner* — Mardochee Chery
(74) *Attorney, Agent, or Firm* — Holland & Hart LLP

(57) ABSTRACT

Methods, systems, and devices for exclusion regions for host-side memory address translation are described. In some examples, a host system may be configured to identify regions of logical addresses to be excluded from operating according to logical-to-physical (L2P) address mapping by the host system (e.g., for access commands), including such techniques that may be associated a host performance boosting (HPB) functionality. The host system may signal an indication for a memory system to inhibit communication of L2P mapping table information to the host system for the identified regions, which may inhibit, suppress, or exclude HPB functionality for those identified regions. In some examples, the memory system may continue to support HPB functionality by communicating L2P mapping table information for other regions, such as regions of logical addresses that may be read relatively frequently or may otherwise benefit from address translation at the host system.

25 Claims, 7 Drawing Sheets

(51) Int. Cl.
*G06F 13/16* (2006.01)
*G06F 12/02* (2006.01)
(58) Field of Classification Search
USPC ............................................. 711/202
See application file for complete search history.

(56) References Cited

U.S. PATENT DOCUMENTS

2019/0042460 A1* 2/2019 Trika ................ G06F 12/0246
2020/0310983 A1* 10/2020 Byun ................ G06F 12/0253
2020/0387445 A1 12/2020 Byun
2022/0012174 A1* 1/2022 Seok ..................... G06F 3/061

* cited by examiner

EXCLUSION REGIONS FOR HOST-SIDE MEMORY ADDRESS TRANSLATION

CROSS REFERENCE

The present application for patent claims the benefit of U.S. Provisional Patent Application No. 63/125,303 by GYLLENSKOG, entitled "EXCLUSION REGIONS FOR HOST-SIDE MEMORY ADDRESS TRANSLATION," filed Dec. 14, 2020, assigned to the assignee hereof, and expressly incorporated by reference herein.

FIELD OF TECHNOLOGY

The following relates generally to one or more systems for memory and more specifically to exclusion regions for host-side memory address translation.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
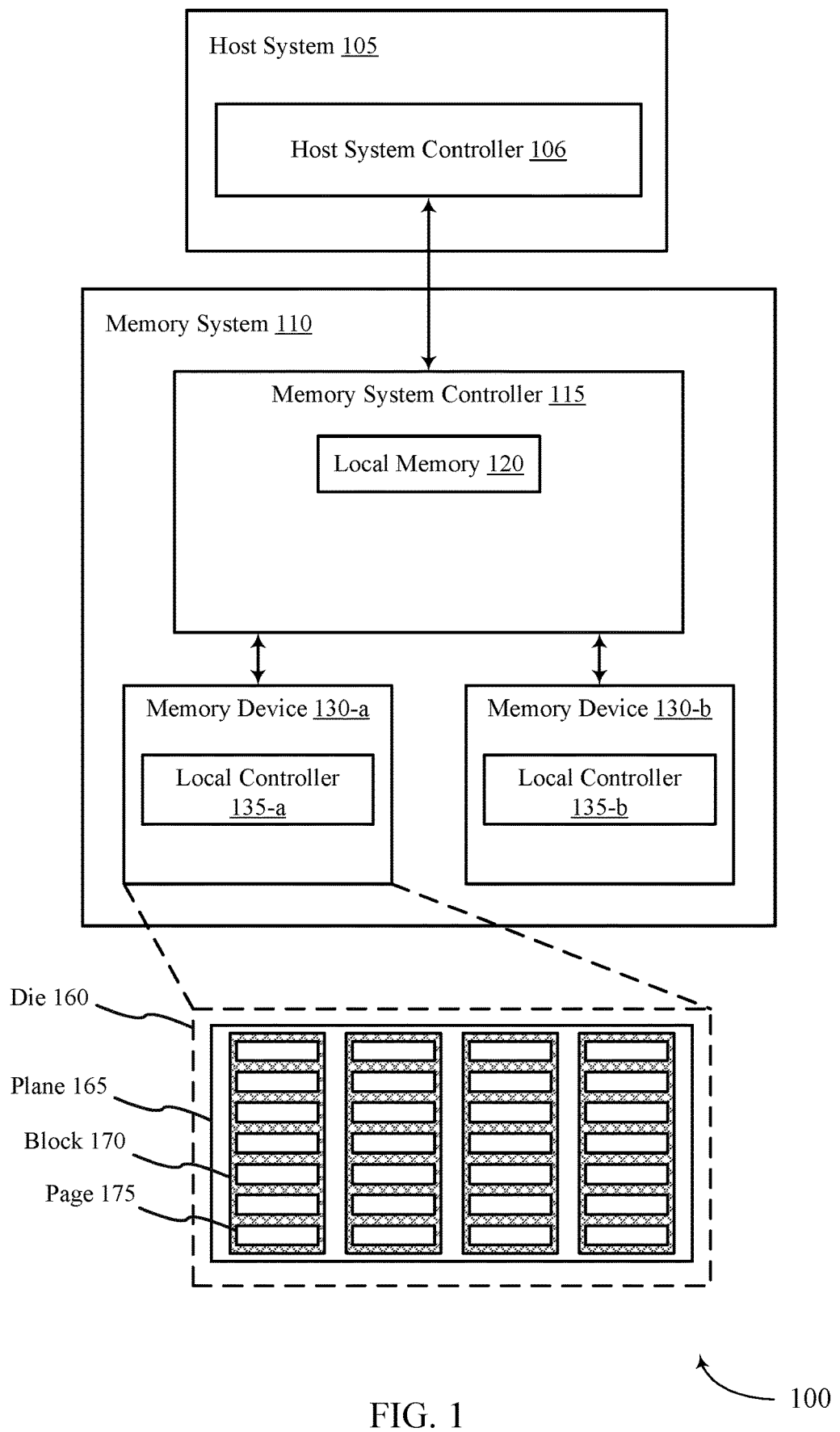
FIG. 1 illustrates an example of a system that supports exclusion regions for host-side memory address translation in accordance with examples as disclosed herein.

A memory system may perform access operations (e.g., read operations, write operations, refresh operations) on memory cells of the memory system, which may be based on access commands received from a host system coupled with the memory system. In some examples, the memory system may perform address translations between logical addressing associated with an access command received from the host system and physical addressing associated with a memory device in the memory system. To support such translations, a controller in the memory system may maintain a table (e.g., a logical-to-physical table (L2P)) that includes a mapping between logical addresses and physical addresses.

In some examples, a system may support a capability of performing access operations using host-side memory address translation, which may be known as a host performance booster (HPB) mode of operation. The host system may have a set of one or more regions (e.g., HPB regions, HPB sub-regions) in a logical address space of the host system, and HPB functionality may be activated by region. In some examples, a region may be activated when a quantity or rate of read commands associated with the region satisfies an activation threshold value, or based on other activation criteria or configurations. For regions of logical addresses activated for HPB operation, the memory system may send corresponding portions of an L2P table to be cached at the host system. By receiving or caching such an L2P table, the host system may perform logical-to-physical address translations for transmitted access commands (e.g., read commands), which may reduce latency or otherwise improve performance compared to scenarios when the memory system performs logical-to-physical address translation for a received access command (e.g., that includes or is otherwise associated with a logical address).

In some examples, such as when a memory system performs a write operation or map operation, physical addresses associated with an L2P table may be modified at the memory system. For example, a write command or map command (e.g., from a host system) may be associated with a change (e.g., an addition, a modification, a re-mapping) of a physical address in the L2P table at the memory system. To support HPB functionality, when such a change occurs (or a threshold number of changes occur) in a region of logical addresses that is activated for HPB operations, the memory system may communicate updated L2P table information to the host system. In some examples, updating L2P table information at the host system may be associated with latency, power consumption, or other phenomena that may limit the benefits of HPB functionality, such as when an associated region of logical addresses is likely to have frequent updates.

In accordance with examples as disclosed herein, a system may be configured to support signaling regions of logical addresses for exclusion from host-side memory address translation (e.g., exclusion from HPB operations or functionality). For example, a host system may be configured to identify regions of logical addresses to be excluded from the communication of L2P table information, or otherwise excluded from operating according to L2P address mapping by the host system (e.g., for access commands). The host system may signal an indication for the memory system to inhibit communication of L2P table information for the identified regions, which may inhibit, suppress, or exclude HPB functionality for those identified regions. In some examples, the memory system may continue to support HPB functionality by communicating L2P table information for other regions, such as regions of logical addresses that may be read relatively frequently or may otherwise benefit from address translation at the host system. By supporting a signaling of such exclusion regions, a system may be configured to avoid updating L2P table information at the host system for certain regions of logical addresses, such as those regions that are known (e.g., by the host system) to be frequently updated, which may reduce latency, reduce power consumption, or otherwise improve performance of the system.

Features of the disclosure are initially described in the context of systems, devices, and circuits as described with reference to FIG. 1. Features of the disclosure are described in the context of logical units and process flows as described with reference to FIGS. 2 and 3. These and other features of the disclosure are further illustrated by and described with reference to apparatus diagrams and flowcharts that relate to exclusion regions for host-side memory address translation as described with reference to FIGS. 4 through 7.

FIG. 1 illustrates an example of a system 100 that supports exclusion regions for host-side memory address translation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of one or more memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses (PBAs)) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 is illustrated as including a memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and where each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line, which may alternatively be referred to as a bit line.

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115. In some cases, at least a portion of an L2P mapping table may be loaded from a memory device 130 to the local memory 120 to reduce address translation latency (e.g., of the memory system controller 115), among other performance improvements.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may support a capability of performing access operations using host-side memory address translation, which may be known as an HPB functionality or mode of operation. For regions of logical addresses activated for HPB operation (e.g., activated HPB regions, activated HPB sub-regions), the memory system 110 may send corresponding portions of an L2P table to the host system 105, which may support the host system 105 performing logical-to-physical address translations for transmitted access commands. In various examples, supporting address translations at the host system 105 may reduce latency associated with the memory system 110 performing such translations (e.g., related to processing operations associated with such translations, related to transferring L2P table information from a memory device 130 to a local memory 120), or may reduce the size of a portion of a local memory 120 (e.g., an SRAM array) allocated to caching L2P table information, among other benefits.

HPB functionality may be activated by the memory system 110 or the host system 105 on a per-region basis for a set of regions of logical addresses. In various examples, the host system 105 may request L2P mapping information from the memory system 110 (e.g., in a host control mode of an HPB configuration), or the memory system 110 may be configured to send the host system 105 information based on an event occurring (e.g., in a device control mode of an HPB configuration), such as an L2P table modification, a garbage collection operation, a change in a value used by the host system 105 to activate a region, or other event. Additionally or alternatively, the memory system 110 or the host system 105 may deactivate HPB functionality on a per-region basis, such as when an L2P table associated with the region of logical addresses is modified to cause an inconsistency relative to information stored in the L2P table at the host system 105.

In accordance with examples as disclosed herein, the system 100 may be configured to support signaling regions of logical addresses for exclusion from host-side memory address translation (e.g., exclusion from HPB operations or functionality). For example, the host system 105 may be configured to identify regions of logical addresses to be excluded from the communication of L2P table information, or otherwise excluded from operating according to L2P address mapping by the host system 105 (e.g., for access commands). The host system 105 may signal an indication for the memory system 110 to inhibit communication of L2P table information for the identified regions, which may inhibit, suppress, or exclude HPB functionality for those identified regions. In some examples, the memory system 110 may continue to support HPB functionality by communicating L2P table information for other regions (e.g., according to a device control mode), such as regions of logical addresses that may be read relatively frequently or may otherwise benefit from address translation at the host system 105 (e.g., regions not identified by the host system 105 for exclusion from host-side memory address translation). By supporting a signaling of such exclusion regions, the system 100 may be configured to avoid updating L2P table information at the host system 105 for certain regions of logical addresses, such as those regions that are known (e.g., by the host system 105) to be frequently updated, while still supporting HPB functionality for other regions, which may reduce latency, reduce power consumption, or otherwise improve performance of the system 100.

The system 100 may include any quantity of non-transitory computer readable media that support exclusion regions for host-side memory address translation. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
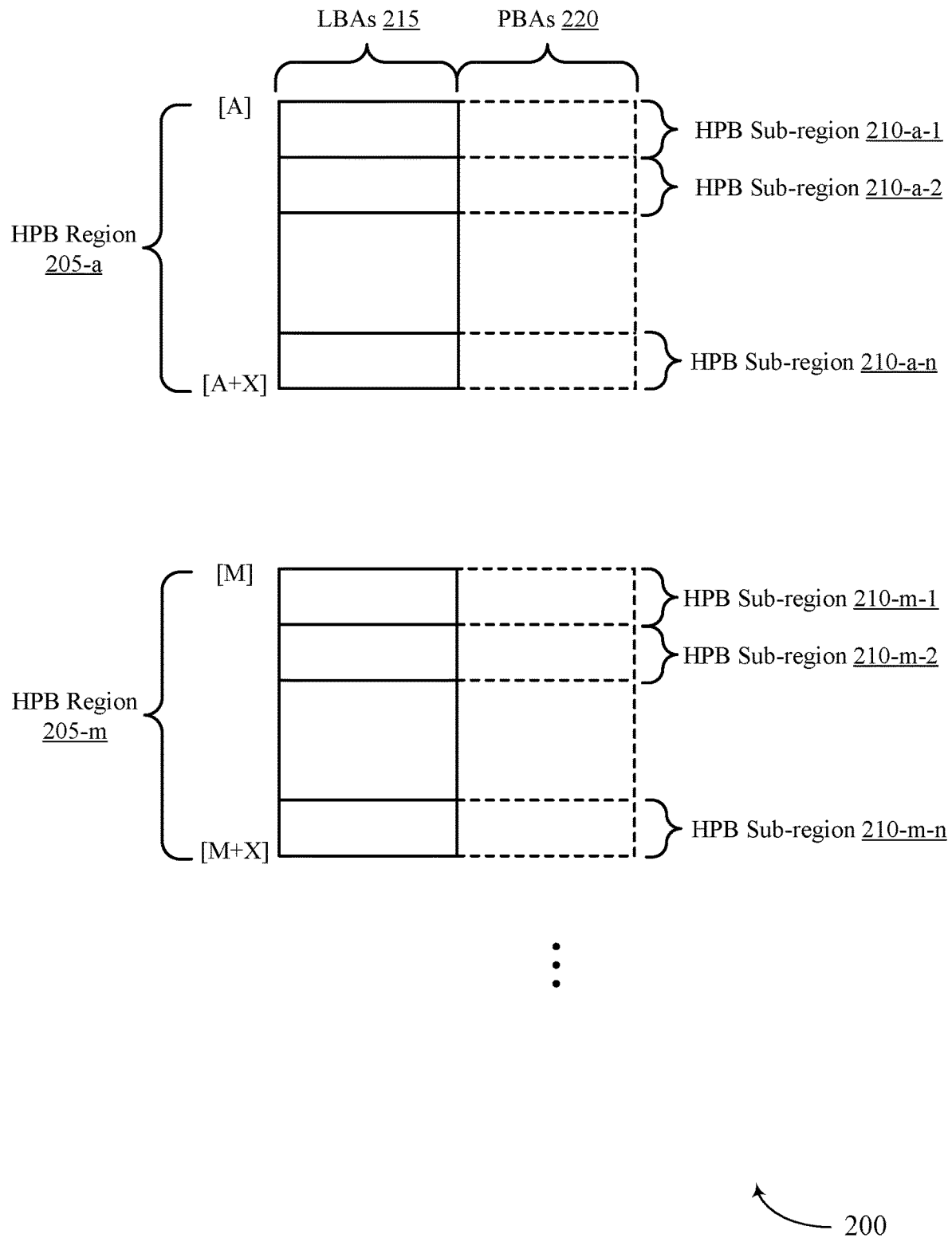
FIG. 2 illustrates an example of a logical unit that supports exclusion regions for host-side memory address translation in accordance with examples as disclosed herein.

FIG. 2 illustrates an example of a logical unit 200 that supports exclusion regions for host-side memory address translation in accordance with examples as disclosed herein. A logical unit 200 may be associated with a logical address space in a system 100 (e.g., a host system 105). A system 100 may have one or more logical units 200 in the logical address space, each of which may be referred to by a logical unit number (LUN).

Address space of the logical unit 200 may be divided into HPB regions 205, each of which may be associated with a range of LBAs 215 that may or may not be contiguous (e.g., HPB region 205-a associated with LBAs [A] through [A+X], HPB region 205-m associated with LBAs [M] through [M+X]). In some examples, the logical unit 200 may include or be otherwise associated with physical addresses (e.g., PBAs 220) for one or more of the LBAs 215 (e.g., according to an L2P mapping). The PBAs 220 may correspond to physical addressing within a memory system 110, and, in an HPB configuration, PBAs 220 may be used for (e.g., included in) HPB commands by a host system 105 to the memory system 110 (e.g., commands by a host system 105 that are associated with physical addresses as determined at the host system 105).

In some examples, each of the HPB regions 205 may be configured to be activated or deactivated for HPB functionality. For example, the HPB region 205-a may be activated, corresponding to a mode of operation where a memory system 110 communicates L2P table information (e.g., mapping between LBAs 215 and PBAs 220) for at least a portion of the HPB region 205-a for caching or processing at a host system 105. Each HPB region 205 may be further divided into HPB sub-regions 210, which may be associated with a size specified by a parameter of a geometry descriptor. In some examples, each HPB sub-region 210 may be configured to be activated or deactivated for HPB functionality. For example, a sub-region 210-a-1 may be activated (e.g., where a memory system 110 communicates L2P table information for the HPB sub-region 210-a-1 for caching or processing at a host system 105) while other HPB sub-regions 210 in the HPB region 205-a may be activated or deactivated (e.g., HPB sub-regions 210-a-2, 210-a-n, 210-m-1, 210-m-2, 210-m-n). In some examples, an HPB region 205 may be considered to be activated if at least one corresponding HPB sub-region 210 is activated.

In some examples, a system 100 may be configured with a quantity (e.g., a maximum quantity) of HPB regions 205 that may be activated concurrently. For example, a quantity of HPB regions 205 that can be maintained at a host system 105 may be based on an amount of storage space (e.g., of a host system controller 106 or associated memory space at the host system 105) for L2P mapping information associated with HPB functionality. A quantity of HPB regions 205 available for activation (e.g., a maximum quantity of HPB regions 205 minus the quantity of HPB regions 205 already activated) may be referred to as a free HPB buffer value. When an HPB region 205 is activated, the host system 105 may be configured to receive and store (e.g., cache) associated L2P table information received from the memory system 110. Thus, the host system 105 may translate from logical addressing to physical addressing for issuing access commands (e.g., read commands) when the HPB region 205 is activated. When an HPB region 205 is deactivated, the host system 105 may be configured to issue access commands associated with the HPB region 205 without performing logical-to-physical address translations (e.g., without including a physical address in the access command). Accordingly, address translations associated with a deactivated HPB region 205 may be performed at the memory system 110.

In some cases, such as when a system 100 is operating in a device control mode, a memory system 110 may activate or deactivate HPB regions 205 based on various criteria. For example, when the memory system 110 determines that an HPB region 205 is accessed (e.g., read) relatively frequently, the memory system 110 may activate the HPB region 205 to reduce latency associated with logical-to-physical address translations, or to offload storage of L2P table information (e.g., from a local memory 120 to a host system 105), among other reasons. However, when an activated HPB region 205 is subject to relatively frequent write operations, or other operations associated with updating L2P mapping information, communicating L2P mapping updates from the memory system 110 to the host system 105 may degrade aspects of performance of the system 100. In some examples, frequently updating L2P mapping information at a host system 105 for an activated HPB region 205 may overwhelm performance benefits associated with activating the HPB region 205, in which case net performance of the system 100 may be improved by maintaining the HPB region 205 in a deactivated state.

In some examples, a host system 105 may be configured with information identifying data or regions of logical addresses that are subject to frequent updates, which may be leveraged to improve aspects of HPB functionality. For example, a system 100 may operate with a file system organized with logs and updates tied to a specific range of LBAs 215, and such data may be updated upon every write operation at a memory system 110. Such a range of LBAs 215 may be subject to frequent updates in mapping to PBAs 220 and, when such a range of LBAs 215 is included in an activated HPB region 205, the HPB region 205 may be associated with frequent communication of L2P mapping updates to the host system 105, which may degrade aspects of system performance. Thus, in accordance with examples as disclosed herein, a host system 105 may be configured to identify regions of LBAs 215 (e.g., HPB regions 205, HPB sub-regions 210) to be excluded from the communication of L2P table information, or otherwise excluded from HPB operations, where such an identification may be based on a type of information or data associated with the region of LBAs 215, or a rate of write operations associated with the region of LBAs 215, among other criteria. The host system 105 may signal an indication for the memory system 110 to inhibit communication of L2P table information for the identified region of LBAs 215, which may inhibit, suppress, or exclude HPB functionality for those identified regions.

Figure 3:
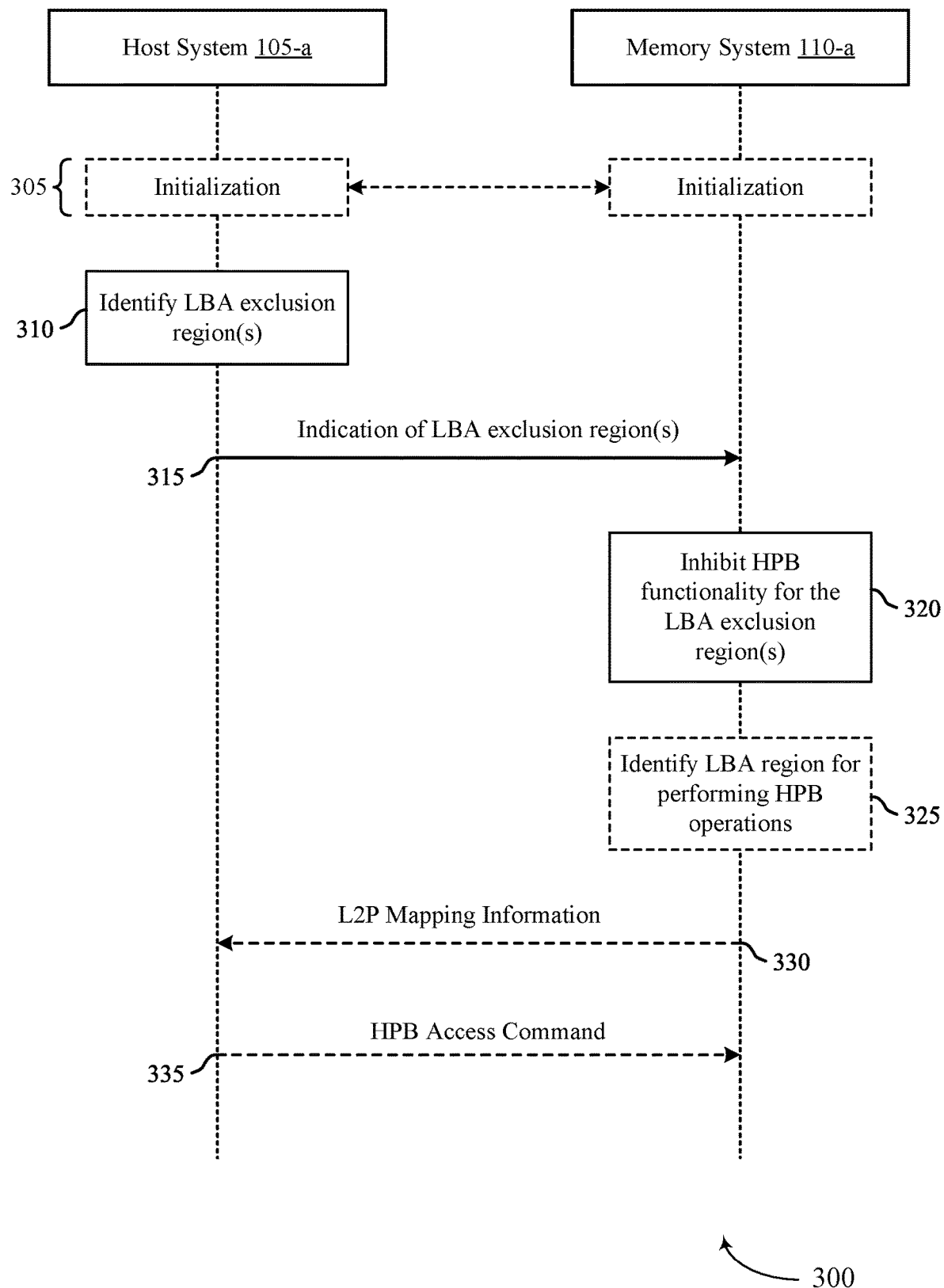
FIG. 3 illustrates an example of a process flow that supports exclusion regions for host-side memory address translation in accordance with examples as disclosed herein.

FIG. 3 illustrates an example of a process flow 300 that supports exclusion regions for host-side memory address translation in accordance with examples as disclosed herein. Aspects of the process flow 300 may be performed by a host system 105-*a* and a memory system 110-*a*, which may be examples of respective systems described with reference to FIGS. 1 and 2.

At 305, the host system 105-*a*, the memory system 110-*a*, or both may perform an initialization. In some examples, the initialization of 305 may be or include an HPB initialization, which may be associated with a system power-up or other operating configuration. For example, the host system 105-*a* and the memory system 110-*a* may perform operations or exchange signaling supporting the host system 105-*a* checking whether the memory system 110-*a* supports HPB functionality, or the memory system 110-*a* signaling device capabilities to the host system 105-*a*, or configuring various HPB parameters at the memory system 110-*a*, among other operations or combinations of operations. In some examples, the operations of 305 may be associated with a HPB cache area being allocated in memory of the host system 105-*a* (e.g., of or associated with a host system controller 106) to contain an L2P mapping table cache. In some examples, one or more (e.g., all) of the initialization operations of 305 may be omitted from the process flow 300 while still supporting aspects of HPB exclusion regions (e.g., according to a preconfiguration at one or both of the host system 105-*a* or the memory system 110-*a*).

In some examples, the initialization of 305 may include configuring the host system 105-*a*, or the memory system 110-*a*, or both for a device control mode of an HPB configuration (e.g., when the host system 105-*a* or the memory system 110-*a* is not already preconfigured in a device control mode). In a device control mode, the memory system 110-*a* may be configured to indicate to the host system 105-*a* which regions of logical addresses (e.g., HPB regions 205, HPB sub-regions 210) should be active for HPB functionality. For example, in a device control mode, the memory system 110-*a* may send recommendations to the host system 105-*a* for activating or inactivating regions of logical addresses, and the host system 105-*a* may be expected to follow such recommendations. The host system 105-*a* may activate a region of logical addresses by loading L2P mapping information (e.g., as received from the memory system 110-*a*) in an HPB cache area of the host system 105-*a*. In some examples, the memory system 110-*a* may indicate a recommendation to inactivate or deactivate a region of logical addresses when the related L2P mapping information is no longer valid, and the host system 105-*a* may inactivate or deactivate the region of logical addresses by not using or discarding the related L2P mapping information from the HPB cache area.

At 310, the host system 105-*a* may identify one or more LBA exclusion regions. For example, the host system 105-*a* may identify one or more regions of logical addresses (e.g., one or more HPB regions 205, one or more HPB sub-regions 210) associated with exclusion from operating according to L2P address mapping by the host system 105-*a* (e.g., for access commands, for read commands). The host system 105-*a* may identify such regions based on various criteria.

For example, the host system 105-*a* may identify exclusion regions based on a rate of write operations associated with the logical addresses (e.g., identifying regions with relatively high write frequency, identifying regions where a rate of write operations exceeds or otherwise satisfies a threshold, identifying regions with relatively high or constant overwrites, identifying regions associated with frequent L2P mapping invalidation), or based on a type of information associated with the logical addresses (e.g., identifying regions associated with file system metadata, identifying regions containing relatively volatile information), or other criteria. In some examples, such an identification may be performed in order to avoid supporting or performing HPB functionality for regions of logical addresses that would involve relatively frequent signaling or updating of L2P mapping information at the host system 105-*a*, which may overwhelm other benefits of performing HPB operations on such a region.

At 315, the host system 105-*a* may signal an indication of the one or more LBA exclusion regions identified at 310, which may be received by the memory system 110-*a*. For example, the host system 105-*a* may signal an indication to inhibit communication of tables for L2P address mapping by the host system 105-*a* for the one or more regions identified at 305 (e.g., as a pinned exclusion). In some examples, the indication of 315 may be associated with deactivating one or more HPB regions 205 or one or more HPB sub-regions 210 (e.g., as a commanded deactivation, as a forced deactivation, as a persistent deactivation, as a pinned deactivation), and may include an indication of a starting region for the exclusion and an indication of a quantity of regions for the exclusion. In some examples, the indication received by the memory system 110-*a* may be interpreted as an indication from the host system 105-*a* of one or more regions of logical addresses for which to inhibit communication, to the host system 105-*a*, of mappings between logical addresses and physical addresses (e.g., HPB entries).

At 320, the memory system 110-*a* may inhibit HPB functionality for the one or more indicated LBA exclusion regions. For example, the memory system 110-*a* may inhibit, suppress, or otherwise avoid the communication of the mappings between logical addresses and physical addresses associated with the one or more LBA exclusion regions indicated at 315. Such inhibiting by the memory system 110-*a* may be implemented according to various techniques. For example, an indicated LBA exclusion region may be removed from a candidate set of regions of logical addresses (e.g., HPB regions 205, HPB sub-regions 210) for evaluating activation or deactivation of HPB functionality. Additionally or alternatively, if a region of logical addresses included in an LBA exclusion region is determined as a candidate or preferred region for HPB activation, such a determination may be ignored or skipped such that a different region of logical addresses (e.g., not included in the LBA exclusion region) may be selected for activation of HPB functionality. In other words, the memory system 110-*a* may determine whether or not a region of logical addresses being considered for activation is included in an indicated LBA exclusion region before proceeding with the activation. In some examples, the memory system 110-*a* may inhibit, suppress, or otherwise avoid sending a recommendation to the host system 105-*a* to activate an HPB region 205 or HPB sub-region 210 that is included in an indicated LBA exclusion region. In some examples, when the memory system 110-*a* identifies that a region of logical addresses is frequently accessed (e.g., read), but is included in an indicated LBA exclusion region, the memory system 110-*a* may cache L2P mapping information in local memory 120 (e.g., from a memory device 130, as an alternative to activating an associated HPB region 205 or HPB sub-region 210) to reduce latency associated with accessing the frequently-accessed region, which may be a persistent caching in the local memory 120 that is maintained for some duration or according to certain conditions.

In some examples, the host system 105-a or the memory system 110-a may support indications or configurations where one or more regions of logical addresses are to always remain activated for HPB functionality (e.g., according to a "pinned region" of activation). In some examples, a host system 105-a may determine or be otherwise aware of such a pinned region, and may avoid including logical addresses of a pinned region in an LBA exclusion region. However, in the event of conflict (e.g., where one or more logical addresses are included in both a pinned region and an LBA exclusion region), the host system 105-a, the memory system 110-a, or both may be configured to perform a default operation or an order of precedence. For example, an exclusion of a logical address in a pinned region may be ignored, or a pinning of a logical address in an exclusion region may be ignored, or a pinning of a logical address and an exclusion of a logical address or region may cancel such that activation or deactivation may be subject to other criteria. In some examples, such a conflict may flag an error state or error operation at the host system 105-a, at the memory system 110-a, or both In some examples, at 325, the memory system 110-a may identify an LBA region for performing (e.g., proceeding with) HPB operations. For example, the memory system 110-a may identify a region of logical addresses (e.g., an HPB region 205, an HPB sub-region 210) not included in an indicated LBA exclusion region for communication of associated mappings between logical addresses and physical addresses. In various examples, the identification of 325 may be based at least in part on the inhibiting described with reference to 325, such as excluding LBA exclusion regions from a candidate list for activation, or ignoring or suppressing an identification of logical addresses included in an LBA exclusion region for activating HPB functionality, among other techniques. In some examples, to identify a region of logical addresses for activating HPB functionality, the memory system 110-a may identify that a region of logical addresses satisfies a criteria (e.g., meets or exceeds a threshold rate or quantity of read operations), and the memory system 105-a may inhibit the communication of the mappings associated with an LBA exclusion region irrespective of whether logical addresses of an LBA exclusion region satisfy the same criteria. Although the operations of 325 are illustrated as following the operations of 320, according to various techniques, aspects of the operations described with reference to 320 and 325 may be performed concurrently, or in an opposite order.

In some examples, at 330, the memory system 110-a may communicate L2P mapping information for the LBA region identified at 325 (e.g., new or updated HPB entries), which may be received by the host system 105-a. For example, the memory system 110-a may communicate mappings between logical addresses and physical addresses associated with the region identified at 325. In some examples, at 330, the host system 105-a may receive tables or other L2P mapping information for a region of logical addresses not included in the one or more LBA exclusion regions indicated at 315.

In some examples, at 335, the host system 105-a may transmit an HPB access command, which may be received by the memory system 110-a to perform a responsive access operation (e.g., a responsive read operation). The access command of 335 may be an example of an HPB read command, which may include an indication of a physical address of the memory system 110-a that was determined based at least in part on L2P mapping information received at 330. In some examples, an HPB read command may include a PBA in addition to an LBA and a transfer length. The host system 105 may use an HPB read command when reading an LBA whose L2P mapping entry is available in an HPB cache (e.g., of an activated HPB region 205 or sub-region 210). In some examples, an access operation in response to an HPB read command may be performed more quickly than an access operation in response to a read command that does not include a PBA (e.g., due to offloading of address translation from the memory system 110-a to the host system 105-a, due to avoiding the memory system 110-a searching for and uploading L2P mapping from a memory device 130 to a local memory 120).

Figure 4:
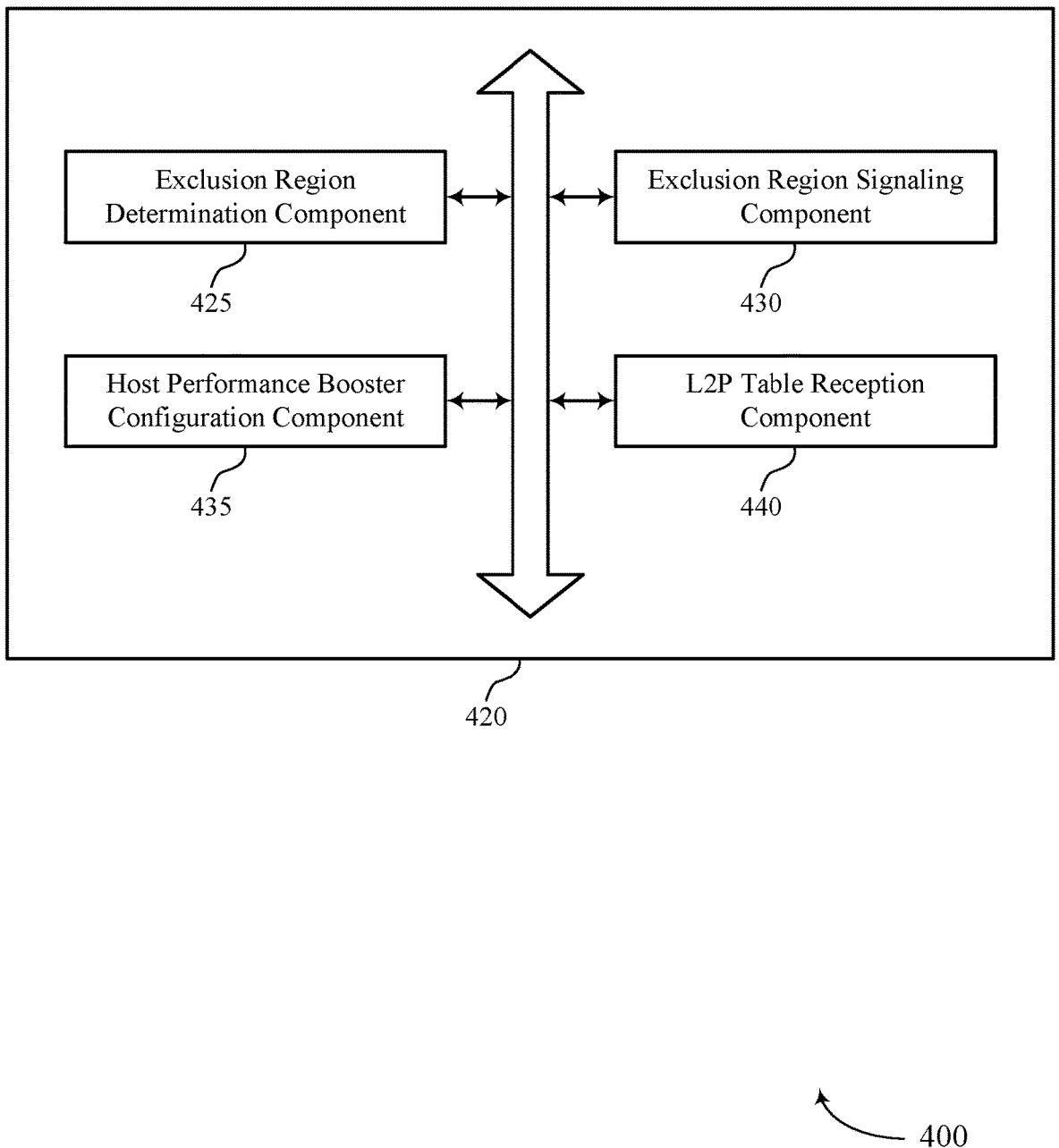
FIG. 4 shows a block diagram of a host system that supports exclusion regions for host-side memory address translation in accordance with examples as disclosed herein.

FIG. 4 shows a block diagram 400 of a host system 420 that supports exclusion regions for host-side memory address translation in accordance with examples as disclosed herein. The host system 420 may be an example of aspects of a host system as described with reference to FIGS. 1 through 3, and may be configured for coupling with a memory system. The host system 420, or various components thereof, may be an example of means for performing various aspects of exclusion regions for host-side memory address translation as described herein. For example, the host system 420 may include an exclusion region determination component 425, an exclusion region signaling component 430, a host performance booster configuration component 435, an L2P table reception component 440, or any combination thereof. Each of these components may communicate, directly or indirectly, with one another (e.g., via one or more buses).

The exclusion region determination component 425 may be configured as or otherwise support a means for identifying one or more regions of logical addresses of the memory system associated with exclusion from operating according to logical to physical addresses mapping by the host system for access commands. The exclusion region signaling component 430 may be configured as or otherwise support a means for signaling (e.g., to the memory system) an indication to inhibit communication of tables for logical to physical address mapping by the host system for the one or more regions.

In some examples, to support identifying the one or more regions, the exclusion region determination component 425 may be configured as or otherwise support a means for identifying the one or more regions based at least in part on a rate of write operations associated with the one or more regions. In some examples, to support identifying the one or more regions, the exclusion region determination component 425 may be configured as or otherwise support a means for identifying the one or more regions based at least in part on a type of information associated with the one or more regions.

In some examples, the one or more regions may include one or more HPB regions of a plurality of HPB regions of the memory system. In some examples, to support signaling the indication, the exclusion region signaling component 430 may be configured as or otherwise support a means for signaling an indication associated with deactivating the one or more HPB regions. In some examples, to support signaling the indication, the exclusion region signaling component 430 may be configured as or otherwise support a means for signaling an indication of a starting region for the exclusion and an indication of a quantity of the one or more HPB regions for the exclusion.

In some examples, the host performance booster configuration component 435 may be configured as or otherwise support a means for configuring the host system for a device control mode of a host performance booster configuration.

In some examples, the L2P table reception component 440 may be configured as or otherwise support a means for receiving, at the host system, tables for logical to physical address mapping for a region of logical addresses of the memory system not included in the one or more regions.

Figure 5:
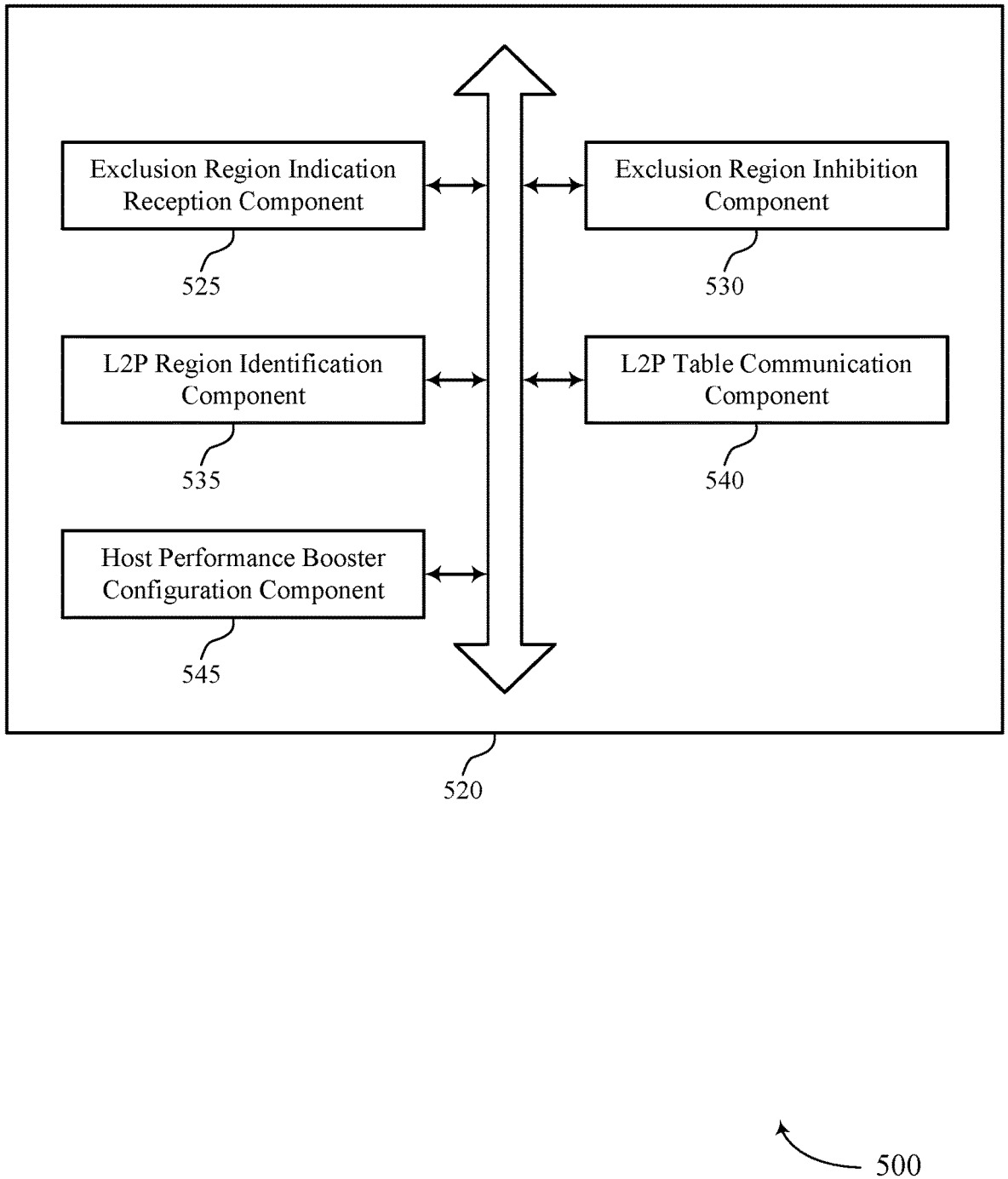
FIG. 5 shows a block diagram of a memory system that supports exclusion regions for host-side memory address translation in accordance with examples as disclosed herein.

FIG. 5 shows a block diagram 500 of a memory system 520 that supports exclusion regions for host-side memory address translation in accordance with examples as disclosed herein. The memory system 520 may be an example of aspects of a memory system as described with reference to FIGS. 1 through 3, and may be configured for coupling with a host system. The memory system 520, or various components thereof, may be an example of means for performing various aspects of exclusion regions for host-side memory address translation as described herein. For example, the memory system 520 may include an exclusion region indication reception component 525, an exclusion region inhibition component 530, an L2P region identification component 535, an L2P table communication component 540, a host performance booster configuration component 545, or any combination thereof. Each of these components may communicate, directly or indirectly, with one another (e.g., via one or more buses).

The exclusion region indication reception component 525 may be configured as or otherwise support a means for receiving an indication (e.g., from the host system) of one or more regions of logical addresses of the memory system for which to inhibit communication (e.g., to the host system) of mappings between logical addresses and physical addresses for the one or more regions. The exclusion region inhibition component 530 may be configured as or otherwise support a means for inhibiting the communication of the mappings between logical addresses and physical addresses of the memory system associated with the one or more regions based at least in part on receiving the indication.

In some examples, the L2P region identification component 535 may be configured as or otherwise support a means for identifying, based at least in part on the inhibiting, a region of logical addresses of the memory system not included in the one or more regions for communication of the mappings between logical addresses and physical addresses of the memory system. In some examples, the L2P table communication component 545 may be configured as or otherwise support a means for communicating the mappings between logical addresses and physical addresses of the memory system associated with the identified region.

In some examples, to support identifying the region of logical addresses, the L2P region identification component 535 may be configured as or otherwise support a means for identifying that the region of logical addresses satisfies a criteria. In some examples, the exclusion region inhibition component 530 may be configured as or otherwise support a means for inhibiting the communication of the mappings associated with the one or more regions of logical addresses irrespective of whether the one or more regions satisfy the criteria.

In some examples, the one or more regions may include one or more HPB regions of a plurality of HPB regions of the memory system. In some examples, to support receiving the indication, the exclusion region indication reception component 525 may be configured as or otherwise support a means for receiving an indication associated with deactivating the one or more HPB regions. In some examples, to support receiving the indication, the exclusion region indication reception component 525 may be configured as or otherwise support a means for receiving an indication of one of the one or more HPB regions and an indication of a quantity of the one or more HPB regions.

In some examples, the host performance booster configuration component 545 may be configured as or otherwise support a means for configuring the memory system for a device control mode of a host performance booster configuration.

Figure 6:
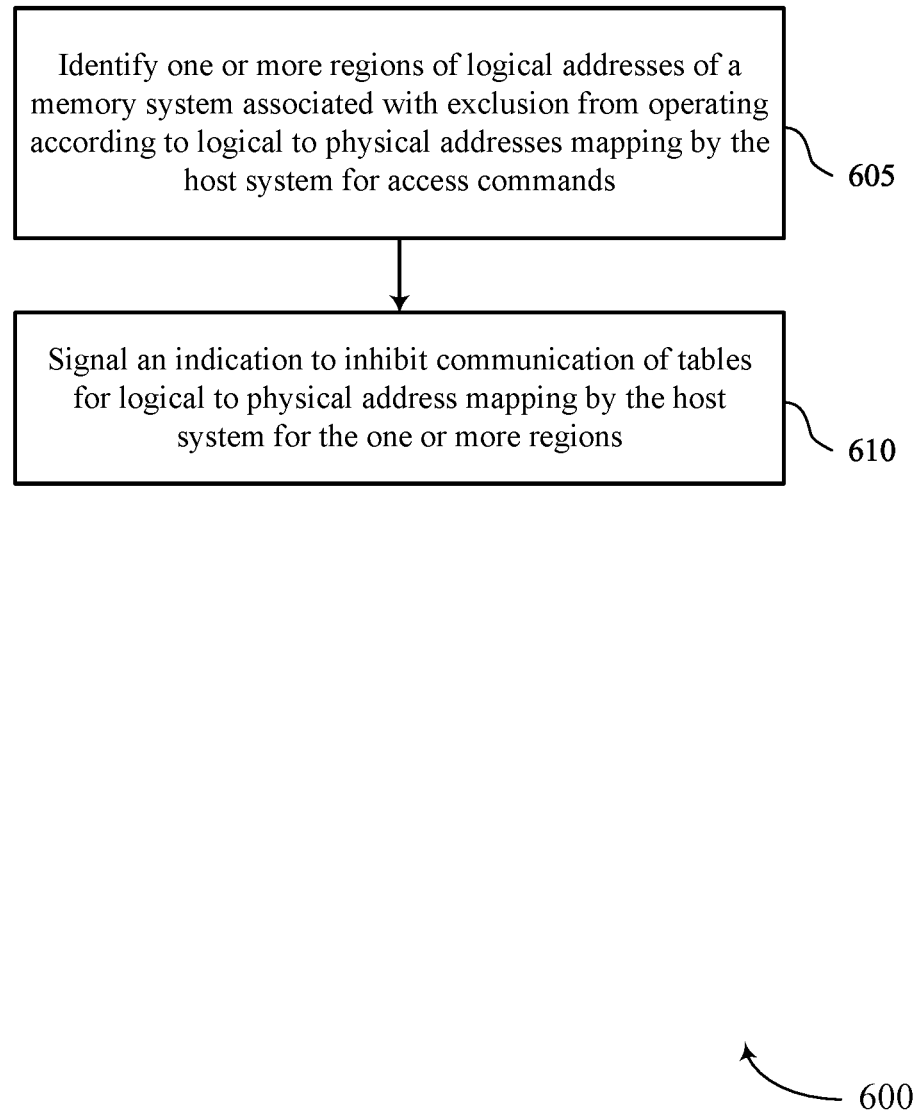
FIGS. 6 and 7 show flowcharts illustrating a method or methods that support exclusion regions for host-side memory address translation in accordance with examples as disclosed herein.

FIG. 6 shows a flowchart illustrating a method 600 that supports exclusion regions for host-side memory address translation in accordance with examples as disclosed herein. The operations of method 600 may be implemented by a host system (e.g., coupled with a memory system) or its components as described herein. For example, the operations of method 600 may be performed by a host system as described with reference to FIGS. 1 through 4. In some examples, a host system may execute a set of instructions to control the functional elements of the device to perform the described functions. Additionally or alternatively, the host system may perform aspects of the described functions using special-purpose hardware.

At 605, the method may include identifying one or more regions of logical addresses of a memory system associated with exclusion from operating according to logical to physical addresses mapping by the host system for access commands. The operations of 605 may be performed in accordance with examples as disclosed herein. In some examples, aspects of the operations of 605 may be performed by an exclusion region determination component 425 as described with reference to FIG. 4.

At 610, the method may include signaling (e.g., to the memory system) an indication to inhibit communication of tables for logical to physical address mapping by the host system for the one or more regions. The operations of 610 may be performed in accordance with examples as disclosed herein. In some examples, aspects of the operations of 610 may be performed by an exclusion region signaling component 430 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for identifying, at a host system coupled with a memory system, one or more regions of logical addresses of the memory system associated with exclusion from operating according to logical to physical addresses mapping by the host system for access commands and signaling, to the memory system, an indication to inhibit communication of tables for logical to physical address mapping by the host system for the one or more regions.

In some examples of the method 600 and the apparatus described herein, identifying the one or more regions may include operations, features, circuitry, logic, means, or instructions for identifying the one or more regions based at least in part on a rate of write operations associated with the one or more regions.

In some examples of the method 600 and the apparatus described herein, identifying the one or more regions may include operations, features, circuitry, logic, means, or instructions for identifying the one or more regions based at least in part on a type of information associated with the one or more regions.

In some examples of the method 600 and the apparatus described herein, the one or more regions may include one or more HPB regions of a plurality of HPB regions of the memory system.

In some examples of the method 600 and the apparatus described herein, signaling the indication may include operations, features, circuitry, logic, means, or instructions for signaling an indication associated with deactivating the one or more HPB regions.

In some examples of the method 600 and the apparatus described herein, signaling the indication may include operations, features, circuitry, logic, means, or instructions for signaling an indication of a starting region for the exclusion and an indication of a quantity of the one or more HPB regions for the exclusion.

Some examples of the method 600 and the apparatus described herein may further include operations, features, circuitry, logic, means, or instructions for configuring the host system for a device control mode of a host performance booster configuration.

Some examples of the method 600 and the apparatus described herein may further include operations, features, circuitry, logic, means, or instructions for receiving, at the host system, tables for logical to physical address mapping for a region of logical addresses of the memory system not included in the one or more regions.

Figure 7:
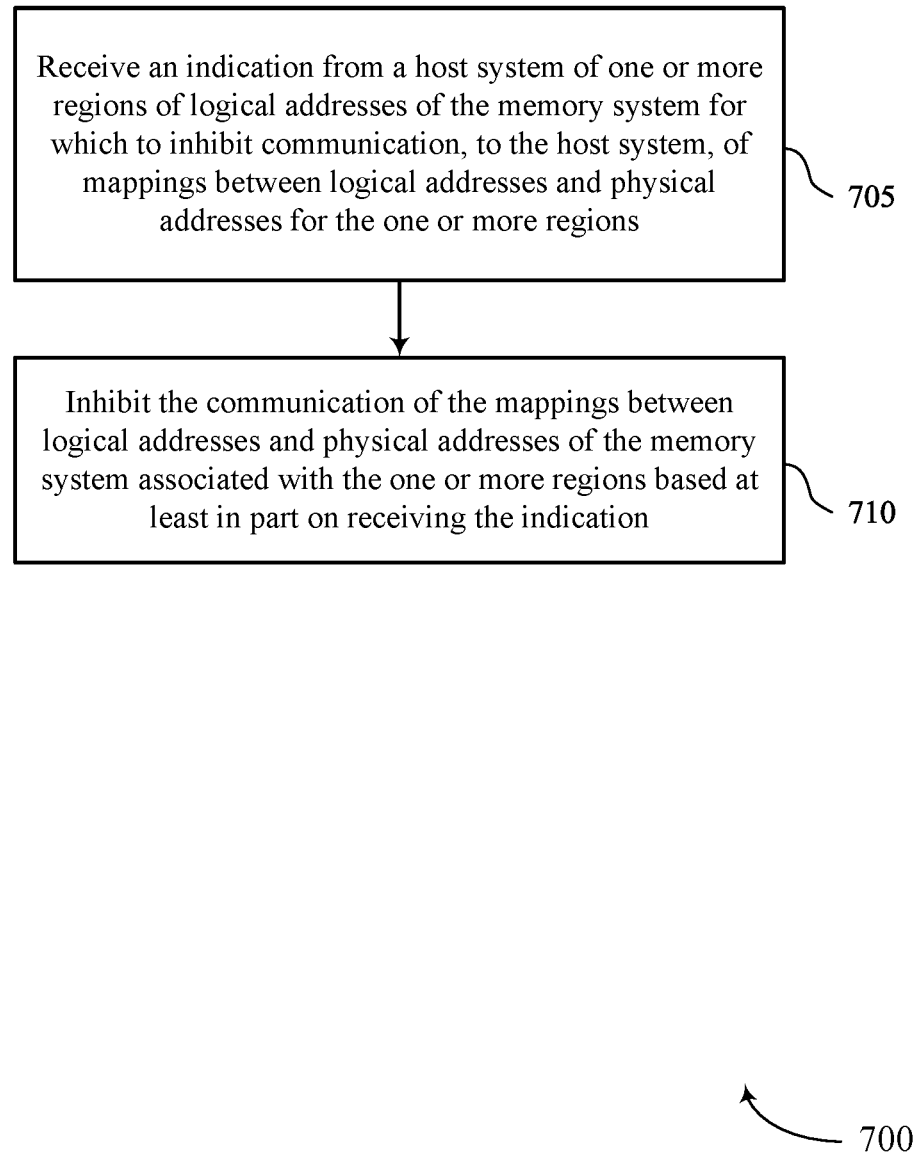

FIG. 7 shows a flowchart illustrating a method 700 that supports exclusion regions for host-side memory address translation in accordance with examples as disclosed herein. The operations of method 700 may be implemented by a memory system (e.g., coupled with a host system) or its components as described herein. For example, the operations of method 700 may be performed by a memory system as described with reference to FIGS. 1 through 3 and 5. In some examples, a memory system may execute a set of instructions to control the functional elements of the device to perform the described functions. Additionally or alternatively, the memory system may perform aspects of the described functions using special-purpose hardware.

At 705, the method may include receiving an indication from a host system of one or more regions of logical addresses of the memory system for which to inhibit communication, to the host system, of mappings between logical addresses and physical addresses for the one or more regions. The operations of 705 may be performed in accordance with examples as disclosed herein. In some examples, aspects of the operations of 705 may be performed by an exclusion region indication reception component 525 as described with reference to FIG. 5.

At 710, the method may include inhibiting the communication of the mappings between logical addresses and physical addresses of the memory system associated with the one or more regions based at least in part on receiving the indication. The operations of 710 may be performed in accordance with examples as disclosed herein. In some examples, aspects of the operations of 710 may be performed by an exclusion region inhibition component 530 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a memory system coupled with a host system, an indication from the host system of one or more regions of logical addresses of the memory system for which to inhibit communication, to the host system, of mappings between logical addresses and physical addresses for the one or more regions and inhibiting the communication of the mappings between logical addresses and physical addresses of the memory system associated with the one or more regions based at least in part on receiving the indication.

Some examples of the method 700 and the apparatus described herein may further include operations, features, circuitry, logic, means, or instructions for identifying, based at least in part on the inhibiting, a region of logical addresses of the memory system not included in the one or more regions for communication of the mappings between logical addresses and physical addresses of the memory system and communicating the mappings between logical addresses and physical addresses of the memory system associated with the identified region.

In some examples of the method 700 and the apparatus described herein, identifying the region of logical addresses may include operations, features, circuitry, logic, means, or instructions for identifying that the region of logical addresses satisfies a criteria and inhibiting the communication of the mappings associated with the one or more regions of logical addresses irrespective of whether the one or more regions satisfy the criteria.

In some examples of the method 700 and the apparatus described herein, the one or more regions may include one or more HPB regions of a plurality of HPB regions of the memory system.

In some examples of the method 700 and the apparatus described herein, receiving the indication may include operations, features, circuitry, logic, means, or instructions for receiving an indication associated with deactivating the one or more HPB regions.

In some examples of the method 700 and the apparatus described herein, receiving the indication may include operations, features, circuitry, logic, means, or instructions for receiving an indication of one of the one or more HPB regions and an indication of a quantity of the one or more HPB regions.

Some examples of the method 700 and the apparatus described herein may further include operations, features, circuitry, logic, means, or instructions for configuring the memory system for a device control mode of a host performance booster configuration.

It should be noted that the methods described above describe possible implementations, and that the operations and the steps may be rearranged or otherwise modified and that other implementations are possible. Further, portions from two or more of the methods may be combined.

An apparatus is described. The apparatus may include a controller of a host system configured to couple with a memory system. The controller may be configured to cause the apparatus to identify one or more regions of logical addresses of the memory system associated with exclusion from operating according to logical to physical address mapping by the host system for access commands and signal, to the memory system, an indication to inhibit communication of tables for logical to physical address mapping by the host system for the one or more regions In some examples, the controller may be configured to cause the apparatus to identify the one or more regions based at least in part on a rate of write operations associated with the one or more regions. In some examples, the controller may be configured to cause the apparatus to identify the one or more regions based at least in part on a type of information associated with the one or more regions.

In some examples of the apparatus, the one or more regions include one or more HPB regions of a plurality of HPB regions of the memory system. In some examples, to signal the indication, the controller may be configured to cause the apparatus to signal an indication associated with deactivating the one or more HPB regions. In some examples, to signal the indication, the controller may be configured to cause the apparatus to signal an indication of a starting HPB region for the exclusion and an indication of a quantity of the one or more HPB regions for the exclusion.

In some examples, the controller may be configured to cause the apparatus to perform host performance booster operations in accordance with a device control mode.

In some examples, the controller may be configured to cause the apparatus to receive tables for logical to physical address mapping for a region of logical addresses of the memory system not included in the one or more regions.

Another apparatus is described. The apparatus may include one or more memory devices and a controller coupled with the one or more memory devices. The controller may be configured to cause the apparatus to receive, from a host system, an indication of one or more regions of logical addresses of the one or more memory devices for which to inhibit communication, to the host system, of mappings between logical addresses and physical addresses of the one or more memory devices and inhibit the communication of the mappings between logical addresses and physical addresses of the one or more memory devices associated with the one or more regions of logical addresses based at least in part on receiving the indication In some examples, the controller may be configured to cause the apparatus to identify, based at least in part on the inhibiting, a region of logical addresses of the one or more memory devices not included in the one or more regions for communication of the mappings between logical addresses and physical addresses of the one or more memory devices and communicate, to the host system, the mappings between logical addresses and physical addresses of the one or more memory devices associated with the identified region.

In some examples, the controller may be configured to cause the apparatus to identify that the region of logical addresses satisfies a criteria and inhibit the communication of the mappings associated with the one or more regions of logical addresses irrespective of whether the one or more regions satisfy the criteria.

In some examples of the apparatus, the one or more regions includes one or more HPB regions of a plurality of HPB regions of the one or more memory devices. In some examples, to receive the indication, the controller may be configured to cause the apparatus to receive an indication associated with deactivating the one or more HPB regions. In some examples, to receive the indication, the controller may be configured to cause the apparatus to receive an indication of a starting HPB region for the exclusion and an indication of a quantity of the one or more HPB regions for the exclusion.

In some examples, the controller may be configured to cause the apparatus to perform host performance booster operations in accordance with a device control mode.

A non-transitory computer-readable medium is described. The non-transitory computer-readable medium may store code including instructions which, when executed by a processor of an electronic device coupled with a memory system, cause the electronic device to identify one or more regions of logical addresses of the memory system associated with exclusion from operating according to logical to physical addresses mapping by the electronic device for access commands by the electronic device, and signal, to the memory system, an indication to inhibit communication of tables for logical to physical addresses mapping by the electronic device for the one or more regions.

In some examples of the non-transitory computer-readable medium, the instructions, when executed by the processor of the electronic device, may cause the electronic device to identify the one or more regions based at least in part on a rate of write operations associated with the one or more regions.

In some examples of the non-transitory computer-readable medium, the instructions, when executed by the processor of the electronic device, may cause the electronic device to identify the one or more regions based at least in part on a type of information associated with the one or more regions.

In some examples of the non-transitory computer-readable medium, to signal the indication, the instructions, when executed by the processor of the electronic device, may cause the electronic device to signal an indication associated with deactivating the one or more HPB regions, associated with the one or more regions, of a plurality of HPB regions of the memory system.

In some examples of the non-transitory computer-readable medium, the instructions, when executed by the processor of the electronic device, may cause the electronic device to configure the electronic device for a device control mode of a host performance booster configuration.

In some examples of the non-transitory computer-readable medium, the instructions, when executed by the processor of the electronic device, may cause the electronic device to receive tables for logical to physical addresses mapping for a region of logical addresses of the memory system not included in the one or more regions.

Another non-transitory computer-readable medium is described. The non-transitory computer-readable medium may store code including instructions which, when executed by a processor of an electronic device coupled with a host system, cause the electronic device to receive an indication from the host system of one or more regions of logical addresses of the electronic device for which to inhibit communication, to the host system, of mappings between logical addresses and physical addresses for the one or more regions, and inhibit the communication of the mappings between logical addresses and physical addresses of the electronic device associated with the one or more regions of logical addresses based at least in part on receiving the indication.

In some examples of the non-transitory computer-readable medium, the instructions, when executed by the processor of the electronic device, may cause the electronic device to identify, based at least in part on the inhibiting, a region of logical addresses of the electronic device not included in the one or more regions for communication of the mappings between logical addresses and physical addresses of the electronic device and communicate, to the host system, the mappings between logical addresses and physical addresses of the electronic device associated with the identified region.

In some examples of the non-transitory computer-readable medium, the instructions, when executed by the processor of the electronic device, may cause the electronic device to identify that the region of logical addresses satisfies a criteria, and inhibit the communication of the mappings associated with the one or more regions of logical addresses irrespective of whether the one or more regions satisfy the criteria.

In some examples of the non-transitory computer-readable medium, the instructions, when executed by the processor of the electronic device, may cause the electronic device to configure the electronic device for a device control mode of a host performance booster configuration.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," "based at least in part on," and "in response to," may be used interchangeably. In some examples, if the terms "if," "when," "based on," "based at least in part on," and "in response to," are used to describe a conditional action or connection between portions of a process, the terms may be interchangeable. In some examples, if used to describe a conditional action or process, the terms "if," "when," "based on," "based at least in part on," and "in response to" may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
  a controller of a host system configured to couple with a memory system, wherein the controller is configured to cause the apparatus to:
    identify, at the host system, one or more regions of logical addresses of the memory system associated with exclusion from operating according to logical to physical address mapping by the host system for access commands; and
    signal, to the memory system, an indication to inhibit communication of tables for logical to physical address mapping by the host system for the one or more regions.

2. The apparatus of claim 1, wherein the controller is configured to cause the apparatus to:
  identify the one or more regions based at least in part on a rate of write operations associated with the one or more regions.

3. The apparatus of claim 1, wherein the controller is configured to cause the apparatus to:
  identify the one or more regions based at least in part on a type of information associated with the one or more regions.

4. The apparatus of claim 1, wherein the one or more regions comprise one or more host performance booster (HPB) regions of a plurality of HPB regions of the memory system.

5. The apparatus of claim 4, wherein, to signal the indication, the controller is configured to cause the apparatus to:
  signal an indication associated with deactivating the one or more HPB regions.

6. The apparatus of claim 4, wherein, to signal the indication, the controller is configured to cause the apparatus to:
  signal an indication of a starting HPB region for the exclusion and an indication of a quantity of the one or more HPB regions for the exclusion.

7. The apparatus of claim 1, wherein the controller is configured to cause the apparatus to:
  perform host performance booster operations in accordance with a device control mode.

8. The apparatus of claim 1, wherein the controller is configured to cause the apparatus to:
  receive tables for logical to physical address mapping for a region of logical addresses of the memory system not included in the one or more regions.

9. An apparatus, comprising:
  one or more memory devices; and
  a controller coupled with the one or more memory devices and configured to cause the apparatus to:
    receive, from a host system, an indication of one or more regions of logical addresses of the one or more memory devices for which to inhibit communication, to the host system, of mappings between logical addresses and physical addresses of the one or more memory devices; and
    inhibit the communication of the mappings between logical addresses and physical addresses of the one or more memory devices associated with the one or more regions of logical addresses based at least in part on receiving the indication.

10. The apparatus of claim 9, wherein the controller is configured to cause the apparatus to:
  identify, based at least in part on the inhibiting, a region of logical addresses of the one or more memory devices not included in the one or more regions for communication of the mappings between logical addresses and physical addresses of the one or more memory devices; and
  communicate, to the host system, the mappings between logical addresses and physical addresses of the one or more memory devices associated with the identified region.

11. The apparatus of claim 10, wherein the controller is configured to cause the apparatus to:
  identify that the region of logical addresses satisfies a criteria; and
  inhibit the communication of the mappings associated with the one or more regions of logical addresses irrespective of whether the one or more regions satisfy the criteria.

12. The apparatus of claim 9, wherein the one or more regions comprises one or more host performance booster (HPB) regions of a plurality of HPB regions of the one or more memory devices.

13. The apparatus of claim 12, wherein, to receive the indication, the controller is configured to cause the apparatus to:
receive an indication associated with deactivating the one or more HPB regions.

14. The apparatus of claim 12, wherein, to receive the indication, the controller is configured to cause the apparatus to:
receive an indication of a starting HPB region for which to inhibit the communication of the mappings and an indication of a quantity of the one or more HPB regions for which to inhibit the communication of the mappings.

15. The apparatus of claim 9, wherein the controller is configured to cause the apparatus to:
perform host performance booster operations in accordance with a device control mode.

16. A non-transitory computer-readable medium storing code comprising instructions which, when executed by a processor of an electronic device of a host system coupled with a memory system, cause the electronic device to:
identify, at the host system, one or more regions of logical addresses of the memory system associated with exclusion from operating according to logical to physical addresses mapping by the electronic device for access commands by the electronic device; and
signal, to the memory system, an indication to inhibit communication of tables for logical to physical addresses mapping by the electronic device for the one or more regions.

17. The non-transitory computer-readable medium of claim 16, wherein the instructions, when executed by the processor of the electronic device, cause the electronic device to:
identify the one or more regions based at least in part on a rate of write operations associated with the one or more regions.

18. The non-transitory computer-readable medium of claim 16, wherein the instructions, when executed by the processor of the electronic device, cause the electronic device to:
identify the one or more regions based at least in part on a type of information associated with the one or more regions.

19. The non-transitory computer-readable medium of claim 16, wherein the one or more regions comprise one or more host performance booster (HPB) regions of a plurality of HPB regions of the memory system, and wherein the instructions to signal the indication, when executed by the processor of the electronic device, cause the electronic device to:
signal an indication associated with deactivating the one or more HPB regions.

20. The non-transitory computer-readable medium of claim 16, wherein the instructions, when executed by the processor of the electronic device, cause the electronic device to:
configure the electronic device for a device control mode of a host performance booster configuration.

21. The non-transitory computer-readable medium of claim 16, wherein the instructions, when executed by the processor of the electronic device, cause the electronic device to:
receive tables for logical to physical addresses mapping for a region of logical addresses of the memory system not included in the one or more regions.

22. A non-transitory computer-readable medium storing code comprising instructions which, when executed by a processor of an electronic device coupled with a host system, cause the electronic device to:
receive an indication from the host system of one or more regions of logical addresses of the electronic device for which to inhibit communication, to the host system, of mappings between logical addresses and physical addresses for the one or more regions; and
inhibit the communication of the mappings between logical addresses and physical addresses of the electronic device associated with the one or more regions of logical addresses based at least in part on receiving the indication.

23. The non-transitory computer-readable medium of claim 22, wherein the instructions, when executed by the processor of the electronic device, cause the electronic device to:
identify, based at least in part on the inhibiting, a region of logical addresses of the electronic device not included in the one or more regions for communication of the mappings between logical addresses and physical addresses of the electronic device; and
communicate, to the host system, the mappings between logical addresses and physical addresses of the electronic device associated with the identified region.

24. The non-transitory computer-readable medium of claim 23, wherein the instructions, when executed by the processor of the electronic device, cause the electronic device to:
identify that the region of logical addresses satisfies a criteria; and
inhibit the communication of the mappings associated with the one or more regions of logical addresses irrespective of whether the one or more regions satisfy the criteria.

25. The non-transitory computer-readable medium of claim 22, wherein the instructions, when executed by the processor of the electronic device, cause the electronic device to:
configure the electronic device for a device control mode of a host performance booster configuration.

* * * * *